(12) United States Patent
Jacobson et al.

(10) Patent No.: US 9,970,474 B2
(45) Date of Patent: May 15, 2018

(54) HOOK DEVICE

(71) Applicants: Jeffrey D. Jacobson, Seattle, WA (US); Jack M. Jacobson, Walla Walla, WA (US)

(72) Inventors: Jeffrey D. Jacobson, Seattle, WA (US); Jack M. Jacobson, Walla Walla, WA (US)

( * ) Notice: Subject to any disclaimer, the term of this patent is extended or adjusted under 35 U.S.C. 154(b) by 250 days.

(21) Appl. No.: 14/737,276

(22) Filed: Jun. 11, 2015

(65) Prior Publication Data

US 2015/0275958 A1 Oct. 1, 2015

Related U.S. Application Data

(63) Continuation-in-part of application No. 14/066,642, filed on Oct. 29, 2013, now abandoned, which is a continuation of application No. 13/787,131, filed on Mar. 6, 2013, now abandoned, which is a continuation-in-part of application No. 13/589,455, filed on Aug. 20, 2012, now abandoned.

(51) Int. Cl.
*F16B 45/00* (2006.01)
*B21F 45/20* (2006.01)
*B21F 45/16* (2006.01)
*A44B 13/00* (2006.01)

(52) U.S. Cl.
CPC .......... *F16B 45/00* (2013.01); *A44B 13/0011* (2013.01); *B21F 45/16* (2013.01); *B21F 45/20* (2013.01); *Y10T 24/314* (2015.01); *Y10T 24/316* (2015.01); *Y10T 24/392* (2015.01); *Y10T 24/3922* (2015.01); *Y10T 24/4755* (2015.01)

(58) Field of Classification Search
CPC .... B60P 7/0823; B60P 7/053; A63B 21/0557; F16B 45/025; F16B 45/00; Y10T 24/4755; Y10T 24/314; Y10T 24/3924; Y10T 24/45969; B62J 7/08; F16G 11/143; F16G 11/046; D06F 53/00
USPC ....... D8/367, 370; 24/68 CD, 300, 301, 370, 24/265 H, 265 CD, 910, DIG. 16; 248/499
See application file for complete search history.

(56) References Cited

U.S. PATENT DOCUMENTS 1,039,045 A * 9/1912 Fuller ..................... D06F 53/00
   24/131 R
1,473,876 A * 11/1923 Robinson ................ D06F 53/04
   24/131 R

* cited by examiner

*Primary Examiner* — Jack W Lavinder
(74) *Attorney, Agent, or Firm* — Patrick M Dwyer

(57) ABSTRACT

An elastic cord terminating in a pair of hook devices, each hook device made from a continuous length of wire. The continuous length of wire at one end has a hook bend having a hook tip, and at the other end a cord attachment. The hook bend and the cord attachment are separated by a straight shank length of the continuous wire into which there is bent a closed finger loop. The finger loop is sized to receive therethrough at least the tip of a finger. The finger loop has a hook proximate surface that is separated longitudinally from the hook tip and toward the cord attachment by a selectable clearance distance.

13 Claims, 4 Drawing Sheets

HOOK DEVICE

CROSS REFERENCE TO RELATED APPLICATIONS

This application is a Continuation-in-Part of U.S. patent application Ser. No. 14/066,642 filed Oct. 29, 2103 which is a Continuation of U.S. patent application Ser. No. 13/787,131 filed Mar. 6, 2013 which is a Continuation-in-Part of Ser. No. 13/589,455 filed Aug. 20, 2012.

TECHNICAL FIELD

The disclosure relates to the field of tie-down and fastening devices; more particularly to an elastic cord with hooks.

BACKGROUND

Elastic cords with hooks are widely used for tying down articles or releasably attaching them to various carriers, surfaces and cargo beds. The conventional arrangement is usually referred to as a bungee cord, and has a hook made of heavy wire with the wire wound around the end of the elastic cord as a helical crimp. The hook is generally U or J shaped.

There are many types of bungee cords that are available on the market, and these can be purchased with a wide variety of hooks. Many hooks are designed with safety and ease of use in mind. Some hooks are large and easy to hold. Some hooks have clasps designed to prevent the hook from becoming disengaged and accidentally recoiling while in use.

Some proposals show clasps and hooks that will not fit into tight places. For general bungee hooks, there are two main grip camps beside the classic U or J shape on a coil of wire: 1) a wide hook with included grasp, which is too wide to fit into tight tie-down access points and has an awkward relationship between the grip handle and the hook (really only suitable for big objects tied to exterior racks); and 2) a pull ring above the hook, which is impossible to use if tying to a blind or interior anchor point. All are relatively complex stamps or molded parts or complex wire or rod bends.

Hook ends for bungee cords are conventionally produced in two ways, differing in how the hook attaches to the elastic cord. One way uses a standard S-hook. One end of the S-hook travels through an opening at the end of the elastic cord, leaving the other end open to serve as a tie-down hook. A second way uses a helical coiled wire with the first coil just slightly larger than the diameter of the elastic cord and the rest of the three or four coils progressively larger to receive the folded-back or swedged cord end.

Safety problems in the use of such tie-downs have often been noted. Grasping the cord or one of the hooks and stretching the cord under tension sometimes results in the hook slipping loose or slipping away before the hook is engaged. The loose hook flying back toward the user, or away toward a bystander, can cause serious injury. Alternate grasping means for such a hook have been proposed both for safety and for ease of use, but the proposed solutions are either cumbersome, relatively fragile, relatively expensive to make, or incapable of attachment in socketed or other relatively inaccessible attachment points.

Many conventional fastening systems do not have a loop on or near their hooks. A loopless hook is difficult to attach to either another hook at the opposite end of the same bungee cord or to a hook of another bungee cord. In addition, many existing bungee cords have hooks that are permanently attached to an elastic cord, often using a proprietary technique that prevents a user from replacing the elastic cord.

What is needed is a grasping point or loop that is a simple bend addition to the classic U or J hook shape, where the loop is advantageously well behind the hook and desirably well to the side of the hook opening (on the closed side of the hook).

DISCLOSURE

A hook and finger loop is disclosed for use in connection with an elastic cord such as a bungee cord. The finger loop is a grasping point that is desirably a simple bend addition to the classic U or J hook shape, where the loop is advantageously well behind the hook and desirably well to the side of the hook opening (on the closed side of the hook).

This hook and loop configuration is particularly useful for heavy wire hook applications, but is not so limited; it is contemplated that hook and loop configurations as disclosed herein may also be put to use with other materials and in shapes other than conventional U or J shaped hooks.

The disclosed loop is desirably longitudinally offset from hook (and optionally latitudinally). That is, the hook protrudes out (relative to the location of the end of the stretchable cord) beyond the loop so the hook is in no way impeded by the loop. The loop is generally integrated with a wire metal hook end and is used to pull or stretch a bungee cord toward a location where the hook will be attached. The loop improves user control and fosters safe operation. The loop also provides an alternate location for securing the same bungee cord opposite hook end or the hook of another bungee cord. The entire hook and loop piece is generally made from a single, unbroken length of steel wire, but alternate assembly and manufacturing arrangements are contemplated as well. For instance, separate wire or metal pieces may be welded into the disclosed hook and loop arrangement to make what is, in effect, a continuous, unbroken length of material.

In one embodiment the loop is fashioned in a circular form from the shank of the hook and is advantageously disposed away from the open hook end. The disclosed hook may alternatively be thought of as comprising a first bend and a second bend. The second bend is connected or connectable to an end of the elastic cord. A shank connects the first bend and the second bend, and the shank has a loop advantageously on the side of the shank opposite the first bend, although in some cases the hook is located on the same side of the shank as is the first bend. The shank can alternatively have two or more loops.

The hook device has a hook bend with a hook tip. The hook bend generally has a conventional U or J shape, though other shapes facilitating secure cord connection with an anchor or attachment point may also be provided. A cord attachment end is provided, generally in the form of conventional helical coil of wire or conventional hook, which may also be a single bend, such as one end of an S-hook. The attachment is separated from the hook bend by a shank length of connecting wire. Where the device is not made from one continuous, unbroken, uncut length of wire, the shank length may be any other suitable material durably connected, attached, welded, or adhered between the hook end and the attachment end.

The shank length has at least one loop with a hook proximate surface. The hook proximate surface is generally the portion of the loop that is nearest to a plane that is perpendicular to the hook tip portion of the hook end. The loop is desirably separated from the hook tip by a selectable clearance distance, which is to say in most cases that the hook proximate surface is advantageously separated from the hook tip by a selectable clearance distance.

The disclosed hook device, or metal hook for a bungee cord, is advantageously made from a continuous (and preferably single) length of wire, generally without breaks in, or additions thereto. The continuous length of wire at one end has a hook bend with a hook tip, and at the other end of the wire a cord attachment. The hook bend and the cord attachment are separated by a generally straight shank length of the continuous wire into which there is bent a closed finger loop, and the finger loop is sized to receive therethrough at least the tip of a finger. The finger loop has a hook, or hook tip, proximate surface, the hook proximate surface being generally an upper portion of the finger loop that is nearest to a plane that is perpendicular at the hook tip to the hook tip portion of the hook bend. The hook proximate surface is separated longitudinally from the hook tip and toward the cord attachment by a selectable clearance distance.

In one embodiment the hook end and the attachment are substantially on the same side of the shank length. That is they are generally coplanar and on the same side of the shank. They do not need to be coplanar however to function as disclosed, and immaterial departures from being coplanar do not remove such departures from the scope of this disclosure and the appended claims. Where a coil is provided as the cord attachment, the coplanar reference is the axis of the coil, rather than the whole coil.

In alternative embodiments the hook end and the attachment are substantially on opposite sides of the shank length. That is they are generally coplanar and on opposite sides of the shank. As disclosed above, they do not need to be coplanar however to function as disclosed, and immaterial departures from being coplanar do not remove such departures from the scope of this disclosure and the appended claims.

Regardless of whether the hook end and the attachment are on the same or opposite sides of the shank, in one embodiment the loop and the hook are substantially on opposite sides of the shank length. Again, coplanarity as discussed above is desirable, but some embodiments may have slight to immaterial variations from the plane. In some cases the loop can project significantly out of the plane, even to the extent of being perpendicular to the plane of the hook end.

Where the hook end and the loop are substantially on opposite sides of the shank, the selectable clearance distance is a distance selected from within a range of 1 to 50 mm, and more preferably within a range of 1 to 10 mm.

In like fashion, whether the hook end and the attachment are on the same or opposite sides of the shank, in one embodiment the loop and the hook are substantially on the same side of the shank length. Again, coplanarity as discussed above is desirable, but some embodiments may have slight to immaterial variations from the plane. In some cases the loop can project significantly out of the plane, even to the extent of being perpendicular to the plane of the hook end.

Where the hook end and the loop are substantially on the same side of the shank, the selectable clearance distance is a distance selected from within a range of 5 to 150 mm, preferably within a range of 25 to 75 mm.

In some embodiments the loop is made of a plurality of windings, the windings wound around an axis that is substantially perpendicular with a plane in which the hook end lies. Desirably, each of the loop windings is substantially the same diameter.

A method of making the disclosed hook device is also disclosed. In the method an end of a length of wire is bent into a hook shape. At a selected distance along the wire back from the hook shape, the wire is bent into at least one loop. At a selected distance along the wire back from the at least one loop, the wire is bent into a cord attachment shape and the wire is cut a selected distance along the wire back from the cord attachment shape.

DETAILED DESCRIPTION

Figure 1:
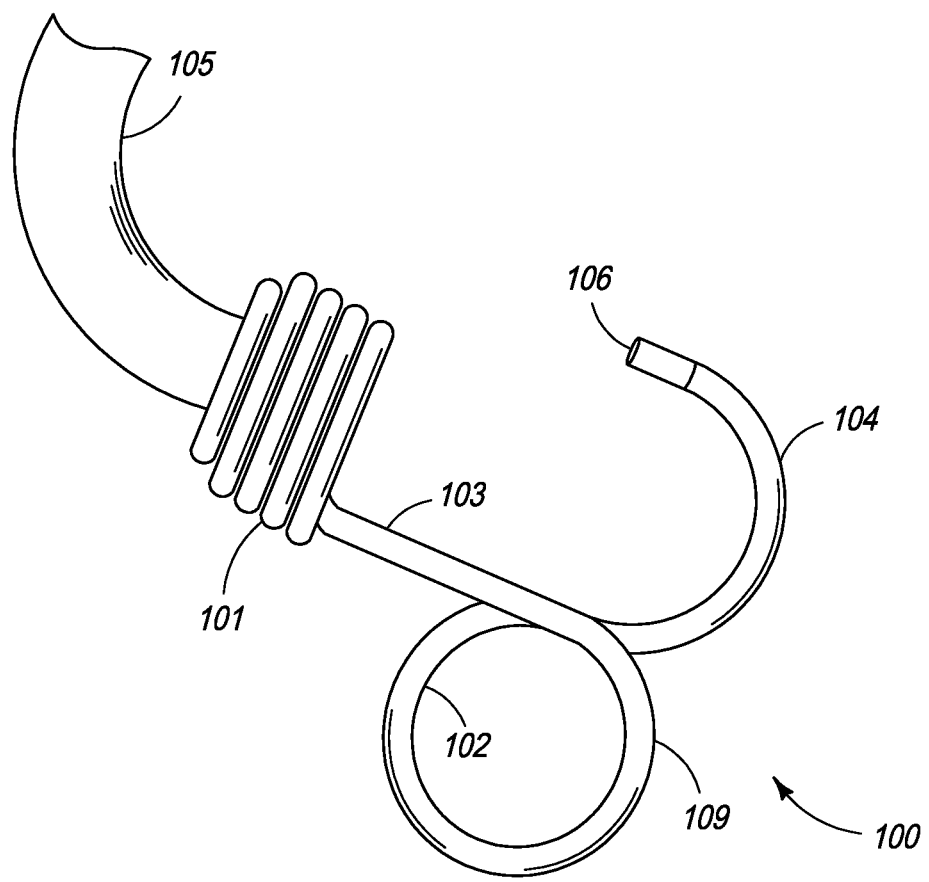
FIG. 1 is a plan view of a disclosed embodiment.

Turning now to the drawings, the invention will be described in preferred embodiments by reference to the numerals of the drawing figures wherein like numbers indicate like parts.

As used throughout this specification, the term 'bungee cord' shall have its plain and ordinary meaning, and may also include any elastic cord (which may be composed of one or more elastic strands, and may be covered with a sheath) which has a hook device on one end or separate hooks on each end. The elastic cord may comprise rubber or any other elastic material. Without limitation, the elastic cord may be an ethylene propylene diene monomer ("EPDM") rubber strap.

A metal hook for a bungee cord is disclosed. One or more metal hooks may be attached to an elastic cord to form a bungee cord before the resulting bungee cord is sold to consumers. Alternatively the metal hook may be manufactured and sold apart from an elastic cord. The metal hook can be made with any metal capable of being stretched into wire, though steel wire is preferable.

FIG. 1 shows a loop integrated with a steel wire hook end that uses coiled wire to create a secure connection to an elastic cord that is knotted or folded and stapled at the end. Hook device 100 has coiled attachment 101, shank length 103, and open hook end 104. Hook end 104 has hook tip 106. Attachment 101 holds an end of cord 105. Cord 105 may be knotted or folded and stapled at the end that is held by attachment 101. Shank length 103 has loop 102. Loop 102 is located on the side of shank 103 opposite hook end 104. Loop 102 has a hook-proximate surface 109.

This embodiment allows a user to attach the hook to an elastic cord having virtually any desired length and any diameter smaller than the opening of coiled end 101, making it easier to replace cord 105 as needed or desired.

Figure 2:
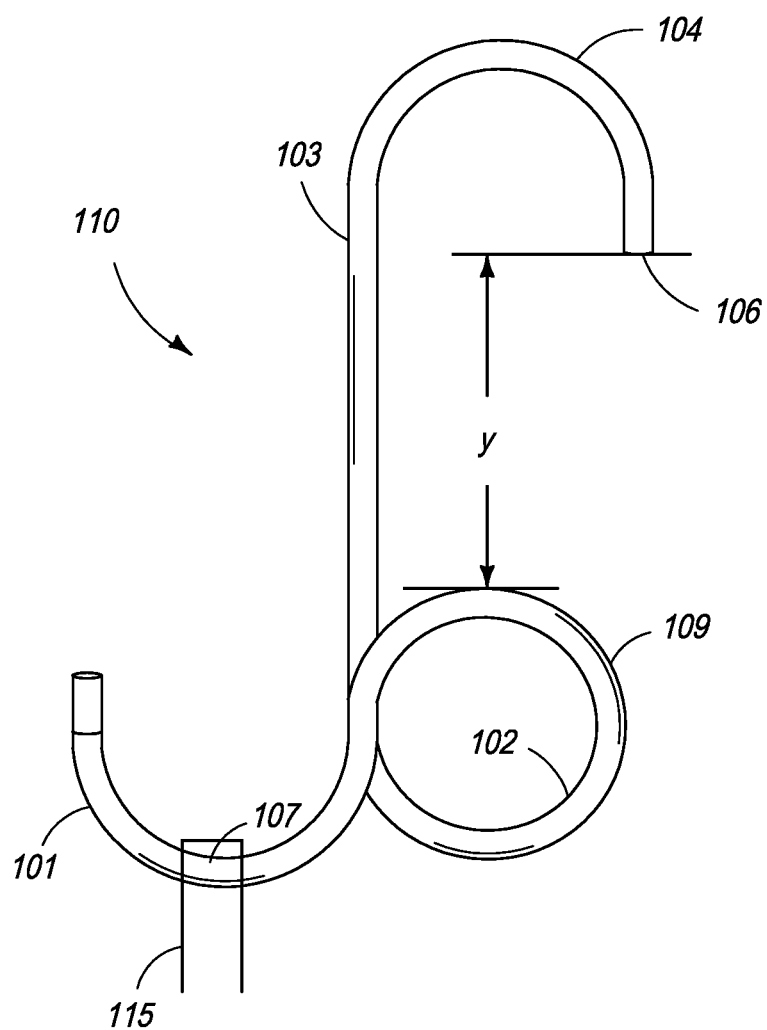
FIG. 2 is a plan view of an alternate disclosed embodiment.

FIG. 2 shows a finger loop on a steel wire S-hook that attaches to an elastic cord through an opening at the end of the cord. Hook device 110 has attachment 101, sometimes herein referred to as a first bend, straight shank length 103, and hook end 104 sometimes herein referred to as a second bend. Hook end 104 has hook tip 106. Hook device 110 may be a conventional steel S-hook with added loop 102, which may be fashioned during formation of the S-hook, or soldered, brazed or welded onto a standard S-hook. Cord 115 desirably has an opening indicated at 107 through which attachment hook 101 has been inserted, thereby securely attaching cord 115 to attachment hook 101. Shank 103 has loop 102 which is shown located on the same side of shank 103 as first bend (hook end) 104.

Loop 102 has hook-proximate surface 109 which is separated by selectable distance y from hook tip 106 to facilitate entry of hook end 104 into recessed or other relatively inaccessible locations while maintaining secure and comfortable finger grasp in loop 102. Loop 102 remains free to be hooked by another object such as another bungee cord.

This embodiment allows a user to attach the hook to an elastic cord having virtually any desired length and any opening 107 into which attachment hook 101 may be inserted, making it easier to replace cord 115 as needed or desired.

A user can insert one or more fingers into the loop or loops and thereby use the device to push or pull a bungee cord toward a location, stretching it to where the hook will be secured, thereby improving a user's control and safe operation of the bungee cord. In the above embodiments, the loop also provides an additional location for securing the opposite hook end of the same bungee cord or the hook of another bungee cord, making the bungee cord more versatile and easier to use The benefits of the device may be especially great when maneuvering in a small area, a pocket or an interior or recessed attachment location, where connection points are few in number or difficult to reach.

The hook is made from steel wire in a preferred embodiment. A hook made from steel wire is stronger than a hook of similar size made of plastic. This embodiment presents numerous advantages that hooks made of plastic do not. Without limitation, those advantages include the fact that a metal hook can be produced in a compact size, yet retain a relatively large loop for maneuvering a bungee cord and providing a location for securing one or more other hooks when the one or more other hooks are attached to the loop of the metal hook. The relatively small diameter of steel wire makes it easy for a user to attach one or more wire hooks to a loop of a hook made from steel wire.

Figure 3:
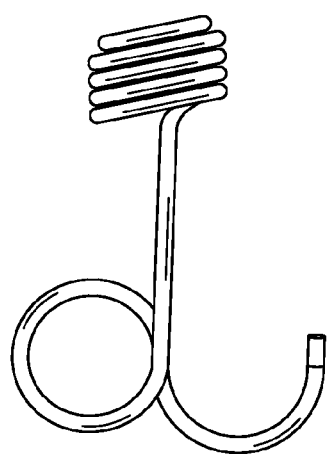
FIG. 3 is a plan view of an alternate disclosed embodiment.
Figure 4:
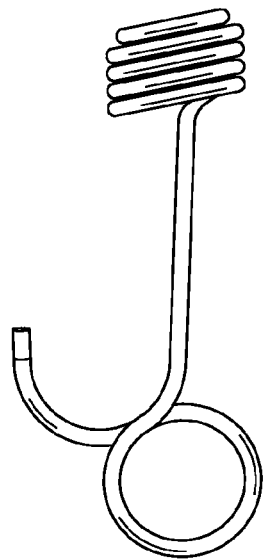
FIG. 4 is a plan view of an alternate disclosed embodiment.
Figure 5:
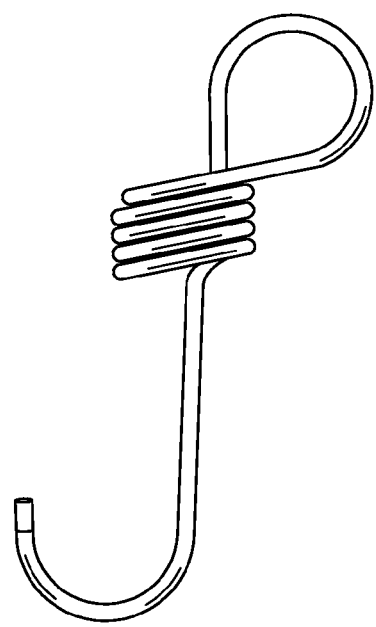
FIG. 5 is a plan view of an alternate disclosed embodiment.
Figure 6:
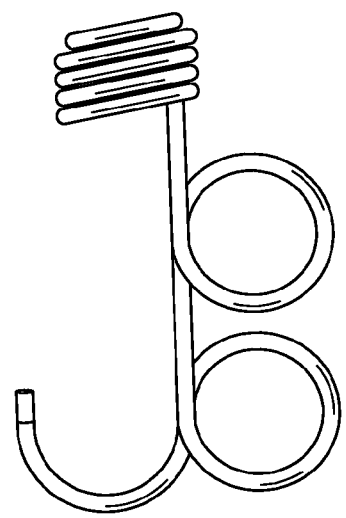
FIG. 6 is a plan view of an alternate disclosed embodiment.

FIGS. 3-6 illustrate alternate embodiments for the disclosed hook device. FIG. 3 shows the loop turned sideways, or perpendicular, to the plane of the hook end. FIG. 4 shows a loop towards the top of the hook. FIG. 5 shows the loop origination from the attachment coiled section of the hook device. Note that if the loop is to be wound in the coil section, it can be wound anywhere in the coil section, beginning, middle or end. FIG. 6 shows a two-finger loop embodiment.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A hook device comprising a continuous length of wire, the continuous length of wire further comprising at one end a hook bend having a hook tip, and at another end a cord attachment, wherein the cord attachment comprises a plurality of windings around an axis that is substantially coplanar with a plane in which the hook bend lies;

the hook bend and the cord attachment separated by a straight shank length of the continuous wire into which there is bent a closed finger loop, the finger loop sized to receive therethrough at least the tip of a finger, the finger loop having a hook proximate surface, the hook proximate surface being generally an upper portion of the finger loop that is nearest to a plane that is perpendicular at the hook tip to the hook tip portion of the hook bend, the hook proximate surface separated longitudinally from the hook tip and toward the cord attachment by a selectable clearance distance.

2. The hook device of claim 1 wherein the hook bend and the finger loop are substantially on the same side of the shank length of wire and the selectable clearance distance is a distance selected from the range of distances from 5 to 150 mm.

3. The hook device of claim 2 wherein the selectable clearance distance is a distance selected from the range of distances from 25 to 75 mm.

4. The hook device of claim 1 wherein the hook bend and the finger loop are substantially on opposite sides of the shank length of wire and the selectable clearance distance is a distance selected from the range of distances from 1 to 50 mm.

5. The hook device of claim 4 wherein the selectable clearance distance is distance selected from the range of distances from 1 to 10 mm.

6. An elastic cord terminating in a pair of hook devices, each hook device comprising a continuous length of wire, the continuous length of wire further comprising at one end a hook bend having a hook tip, and at another end a cord attachment, the hook bend and the cord attachment separated by a straight shank length of the continuous wire into which there is bent a closed finger loop, the finger loop sized to receive therethrough at least the tip of a finger, the finger loop having a hook proximate surface, the hook proximate surface being generally an upper portion of the finger loop that is nearest to a plane that is perpendicular at the hook tip to the hook tip portion of the hook bend, the hook proximate surface separated longitudinally from the hook tip and toward the cord attachment by a selectable clearance distance.

7. The hook device of claim 6 wherein the cord attachment comprises a plurality of windings around an axis that is substantially coplanar with a plane in which the hook bend lies.

8. The hook device of claim 6 wherein the cord attachment comprises a single bend of wire substantially coplanar with a plane in which the hook bend lies.

9. The hook device of claim 6 wherein the hook bend and the finger loop are substantially on the same side of the shank length of wire and the selectable clearance distance is a distance selected from the range of distances from 5 to 150 mm.

10. The hook device of claim 9 wherein the selectable clearance distance is a distance selected from the range of distances from 25 to 75 mm.

11. The hook device of claim 6 wherein the hook bend and the finger loop are substantially on opposite sides of the shank length of wire and the selectable clearance distance is a distance selected from the range of distances from 1 to 50 mm.

12. The hook device of claim 11 wherein the selectable clearance distance is distance selected from the range of distances from 1 to 10 mm.

13. A method of making a hook device, the method comprising the steps of:
- bending an end of a continuous length of wire into a hook shape,
- at a selected distance from the hook shape along the length of wire, further bending the length of wire into a closed finger loop sized to receive therethrough at least the tip of a finger,
- at a selected distance from the finger loop along the length of wire, further bending the length of wire into a cord attachment shape that is a coil.

* * * * *